United States Patent [19]
Clarke et al.

[11] Patent Number: 5,825,936
[45] Date of Patent: Oct. 20, 1998

[54] IMAGE ANALYZING DEVICE USING ADAPTIVE CRITERIA

[75] Inventors: Laurence P. Clarke, Temple Terrace; Wei Qian, Wesley Chapel; Maria Kallergi, Tampa, all of Fla.

[73] Assignee: University of South Florida, Tampa, Fla.

[21] Appl. No.: 730,574

[22] Filed: Oct. 15, 1996

Related U.S. Application Data

[63] Continuation of Ser. No. 310,708, Sep. 22, 1994, abandoned.

[51] Int. Cl.$^6$ .............................. G06K 9/40; G06K 9/00
[52] U.S. Cl. ........................ 382/261; 382/130; 382/131; 382/132
[58] Field of Search ................................. 382/128, 129, 382/130, 131, 132, 133, 260, 261, 262, 263, 264, 265; 364/413.13

[56] References Cited

U.S. PATENT DOCUMENTS

| | | | |
|---|---|---|---|
| 4,887,306 | 12/1989 | Hwang et al. | 382/261 |
| 5,001,429 | 3/1991 | Constable et al. | 324/312 |
| 5,133,020 | 7/1992 | Giger et al. | 382/128 |
| 5,260,871 | 11/1993 | Goldberg | 382/128 |
| 5,331,550 | 7/1994 | Stafford et al. | 364/413.02 |
| 5,351,305 | 9/1994 | Wood et al. | 382/128 |
| 5,392,211 | 2/1995 | Oe | 382/128 |
| 5,408,424 | 4/1995 | Lo | 364/724.01 |
| 5,425,373 | 6/1995 | Causey, III | 128/697 |
| 5,432,865 | 7/1995 | Kasdan et al. | 382/128 |
| 5,537,485 | 7/1996 | Nishikawa et al. | 382/130 |
| 5,578,923 | 11/1996 | Chen | 324/309 |
| 5,598,481 | 1/1997 | Nishikawa et al. | 382/130 |

OTHER PUBLICATIONS

Quian W. et al, "Tree–structured Nonlinear Filters in Digital Mammography" *IEEE Trans. Med. Imag.* 1994 13(1):25–36.

Quian W. et al, "Digital Mammography: M–Channel Quadrature Mirror Filters for Microcalcification Extraction" *Computerized Medical Imaging and Graphics* (accepted for publication 1993).

Clarke LP et al, "Articficial Neural netword for Pattern Recognition in Mammography" *Invited Paper by World Congress on Neural Networks* San Diego, CA Jun. 4–9, 1994.

Richards DW et al, "Enhanced Detection of Normal Retinal Nerve–Fiber Striations Using a Charge–Coupled Device and Digital Filtering" *Graefe's Archive for Clinical and Experimental Opthamology*, 1993, 231:595–599.

*Primary Examiner*—Joseph Mancuso
*Assistant Examiner*—Jayanti K. Patel
*Attorney, Agent, or Firm*—Kohn & Associates

[57] ABSTRACT

A hybrid filter architecture and an artificial neural network is proposed for image enhancement and detection of suspicious areas in digital x-ray images that is operator, image, and digital x-ray sensor independent. The hybrid filter architecture includes an Adaptive Multistage Nonlinear Filter (AMNF) cascaded with an M-channel Tree Structured Wavelet Transform (TSWT). The AMNF shares the advantages of an array of linear and nonlinear filters and is adaptively supervised using either an order statistic or linear operator. The filter is used for noise suppression and image enhancement and adapts to the noise characteristics of the sensor. The TSWT is used for multiresolution image decomposition and reconstruction of subimages for further image enhancement of diagnostic features of interest. A Multistage Artificial Neural Network (MANN) is proposed, together with Kalman Filtering for network training, for both improved detection or classification of suspicious areas and computational efficiency to allow the MANN to be applied to full digital images without operator input. The hybrid filter architecture and MANN may be applied to any gray scale image in medical imaging. The specific application of the proposed method includes: (a) improved enhancement or detection of suspicious areas as a "second opinion" strategy using a computer workstation or (b) mass screening of large image databases such as that used for medical screening programs.

7 Claims, 3 Drawing Sheets

IMAGE ANALYZING DEVICE USING ADAPTIVE CRITERIA

This application is a continuation of application Ser. No. 08/310,708 filed on Sep. 22, 1994 now abandoned.

BACKGROUND OF THE INVENTION

1. Field of the Invention

The invention, in terms of medical goals, relates to the development of software for computer workstations to be used for analysis of digital x-ray or other sensors that generates gray scale images. The clinical aims are: (a) the enhancement and detection of suspicious areas in medical images as a "second opinion" strategy for improved diagnosis and (b) efficient analysis of large image databases for mass screening using software methods that minimize operator interaction.

The invention, in terms of computer software design, relates to image processing methods such as image noise suppression, enhancement and detection of specific diagnostic features, using a computer monitor as a basis for image interpretation. The proposed software algorithms address three areas namely (a) image noise suppression using adaptive nonlinear filters (b) the use of filters and multiresolution wavelet transform methods for image contrast and texture enhancement for specific diagnostic features and (c) using artificial neural networks for detection or classification of specific diagnostic features.

2. Description of Related Art

Multiresolution Methods Wavelet Transform: The multiresolution wavelet transform originally developed in the signal processing field and have recently been proposed for either image enhancement, segmentation or edge detection in the field of digital image enhancement. The motivation for multiresolution approaches is the inherent advantage over traditional filtering methods. The traditional filtering methods primarily focus on the coupling between image pixels on a single scale and generally fail to preserve details of important clinical features. Multiresolution methods previously reported for digital image processing have included modifications to the Gabor transform that require a priori knowledge of the image related parameters such as spatial frequencies, orientations and shape of the Gaussian envelopment function. These multiresolution wavelet transform methods are not preceded by an effective filter for noise suppression or an adaptive filter as required if different sensors are used with varying noise characteristics. These algorithms may therefore result in an unacceptably high false positive (FP) detection rate for suspicious areas in medical imaging, i.e., for diagnostic features such as microcalcification cluster detection in digital mammograms. Finally, current multiresolution or wavelet transform methods for image enhancement are interactive and require operator selection of algorithm parameters for optimum image interpretation, i.e., not suitable for either mass screening of images or reducing inter- or intra-observer variation in image interpretation of diagnostic features.

Non Linear Filtering: In the signal processing literature, several new nonlinear filters have been reported for image noise suppression, with image detail preservation and which may be particularly useful for digital image analysis. These filters fall roughly into one of two categories. The first class is a set of nonadaptive nonlinear filters, which encompasses detail preserving nonlinear filters with fixed parameters. The second class is set of adaptive nonlinear filters. The nonadaptive filters have less computational complexity and are easier to implement. The nonadaptive filters, however, seek only a global balance between noise suppression and image detail preservation. In medical imaging, for example, important features such as boundary, image contrast, or texture of suspicious areas are often faint, imbedded in complex background structures that include spatially variant and signal dependent noise sources. Nonadaptive filters may not necessarily be sufficiently robust for both noise suppression and feature enhancement, particularly across a large image databases. Adaptive nonlinear filters for noise suppression in the field of signal processing have been reported but using only one filter type, with adaptive criteria used for modifying filter parameters such as window size. These single-type filters are not necessarily optimum for noise suppression used on images generated from different sensors that have varying noise characteristics that may, in turn, be signal dependent. Similarly, these filters may not provide optimum noise suppression in medical images with diagnostic features imbedded in complex background structures and image noise, i.e., image detail may not be preserved and single filters may result in high false positive (FP) detection rate for suspicious areas. Finally, the use of single adaptive filters or multistage filters have not been combined with wavelet transform methods for image contrast or texture enhancement in the signal processing field or medical imaging field.

Neural Networks (NNs): The design and application of NNs for pattern recognition or object recognition has been extensively reported in the signal processing field for several years and recently in the medical imaging field as an alternative to other classification methods because of their potential for more universal application. These NN designs reported have included many modifications such as different number of nodes, node activation function, hidden layers and NN architecture. Backpropagation (BP) training algorithms have been extensively reported in the pattern recognition literature for several years and recently used for all medical applications. The use of BP training algorithms for the application of NNs to digital medical images (typically greater than 2K×2K, 12 bits deep) is not computationally efficient and is unrealistic for two reasons. First, to reduce training/execution times the NNs must be applied to small regions of interest i.e. (32×32 pixels), selected by the operator, and the procedure is thus operator dependent. Second, their time of execution places constraints on their use for automatic mass screening of images.

For related articles are listed below:

Qian W, Clarke L P, Kallergi M and Clark R. Tree-structured nonlinear filters in digital mammography. *IEEE Trans. Med. Imag.* 1994 13(1): 25–36.

Qian W, Clarke L P, Li H D, Kallergi M, Clark R A and Silbiger M L. Digital Mammography: M-Channel Quadrature Mirror Filters for Microcalcification Extraction. *Computerized Medical Imaging and Graphics* (accepted for publication 1993).

Richards D W, Janesick J R, Velthuizen R P, Qian W and Clarke L P. Enhanced Detection of Normal Retinal Nerve-Fiber Striations Using a Charge-Coupled Device and Digital Filtering. *Graefe's Archive for Clinical and Experimental Ophthalmology,* 1993, 231 :595–599.

Clarke L P, Zheng B and Qian W. Artificial Neural Network for Pattern Recognition in Mammography. Invited Paper by World Congress on Neural Networks San Diego, Calif., Jun. 4–9, 1994.

U.S. Pat. No. 5,001,429, issued to Constable et al. on Mar. 19, 1991, discloses a nuclear magnetic resonance image enhancer. The image is filtered via a sigma filter. The edges are enhanced. Thereafter, the edged enhanced filtered image set reverse Fourier transformed. The image is then spliced into the transformed image where it is transformed via a Fourier transform. This system is deficient in that it requires the additional edge enhancing step before the filtered image is transformed. Further, the resulting image must be further analyzed manually to locate target objects. Automation is not disclosed therein.

SUMMARY OF THE INVENTION

An image analyzing device for analyzing a digital image having target objects and background noise is disclosed. The image analyzing device comprises a filter for filtering the background noise out of the digital image to create a filtered image. A decomposer decomposes the filtered image into a decomposed image. A reconstructor reconstructs the decomposed image. The image analyzing device is characterized by an edge enhancer for enhancing the edges of the target objects to identify the target objects and for creating an edge enhanced target image.

The image analyzing device filters noise out of the digital image and transforms the image allowing for more accurate target recognition. Further the image analyzing device is trainable to learn to automatically detect targets.

BRIEF DESCRIPTION OF THE DRAWINGS

The advantages of the present invention will be readily appreciated as the same becomes better understood by reference to the following detailed description when considered in connection with the accompanying drawings wherein.

DETAILED DESCRIPTION OF THE PREFERRED EMBODIMENT

An image analyzing device is generally indicated at 20 in the Figures. The image analyzing device 20 analyzes a digital image 10, a mammogram by way of example, having suspicious areas or, in other words, target objects, 12 and background parenchymal tissues and noise 14. Although the image analyzing device is discussed in terms of analyzing a digitized mammogram, it would be apparent to those skilled in the art that the image analyzing device 20 is capable of analyzing any digitized gray scale image generated by a sensor used for medical imaging.

Digital mammograms are an excellent model for the application of the proposed invention. These images may contain a suspicious area of unknown extent imbedded in normal parenchymal tissue or background structures including image noise. Several sources of noise are involved that include noise related to x-ray photon generation, photon transport and detection processes and noise characteristics of the sensor used such as either screen film detection methods or direct x-ray digital detection. The image analyzing device is designed to optimally suppress image noise, enhance specific diagnostic features of interest such as microcalcifications or tumors, while preserving the important feature details for detection using the proposed neural networks.

General Design: The image analyzing device 20 comprises filtering means 22 for filtering the background noise out of the digital image 10 and for enhancing specific chemical features to create a filtered image 16.

The architecture of the algorithm is based on the motivation that the adaptive multistage nonlinear filtering means 22, filter 22, can suppress the noise while enhancing diagnostic features. For example, in mammography screening, different mammographic features are in different resolution scale levels. Four visually distinct ranges of intensity levels usually dominate the images. The lower level corresponds to fat, the second level to breast parenchyma, the third level to masses and the highest intensity level corresponds to calcifications. The wavelet transform together with preprocessing using the adaptive multilevel nonlinear filtering could, therefore, provide an efficient tool for mammographic image analysis.

Figure 1:
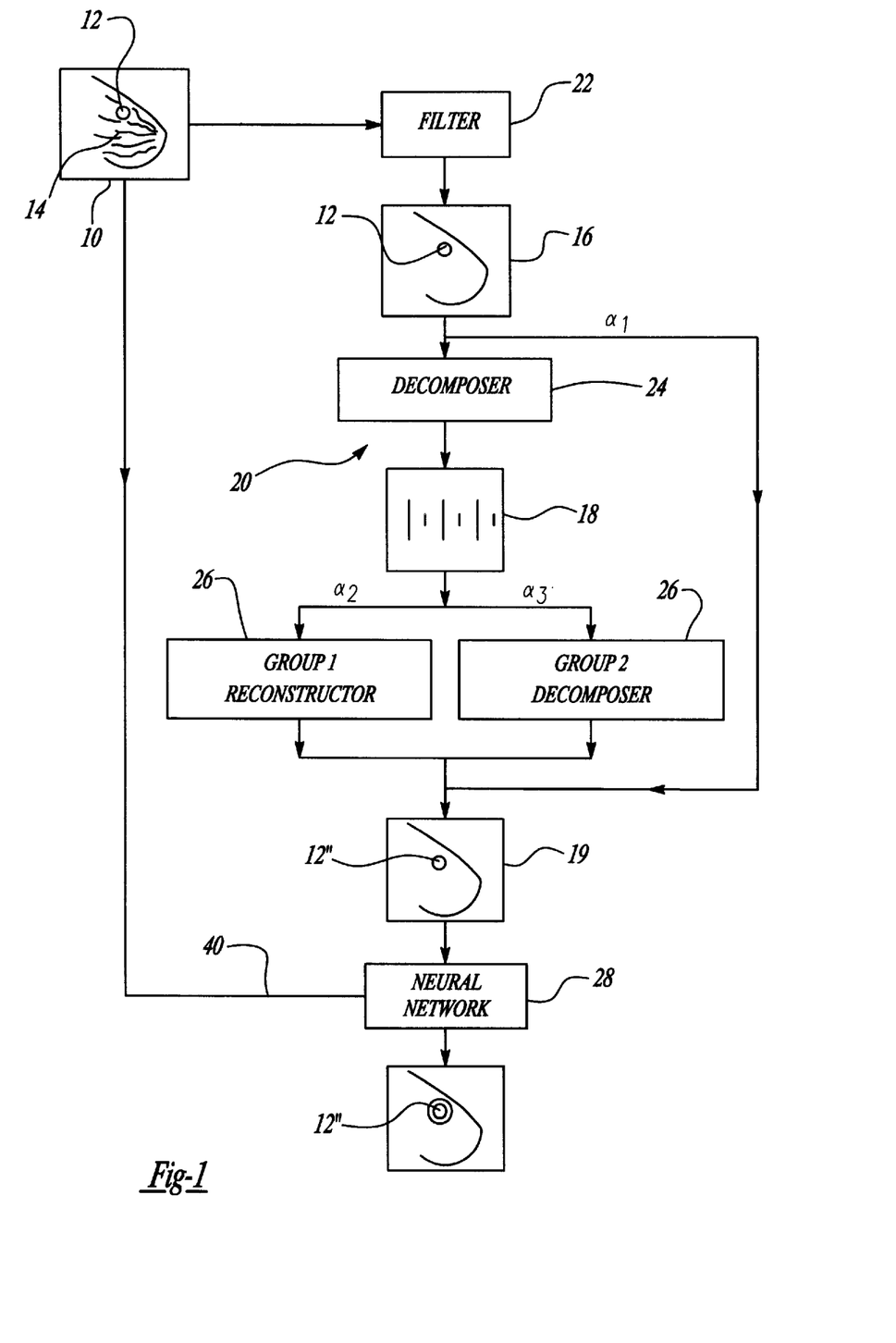
FIG. 1 is a block schematic diagram of the preferred embodiment of the subject invention.
Figure 2:
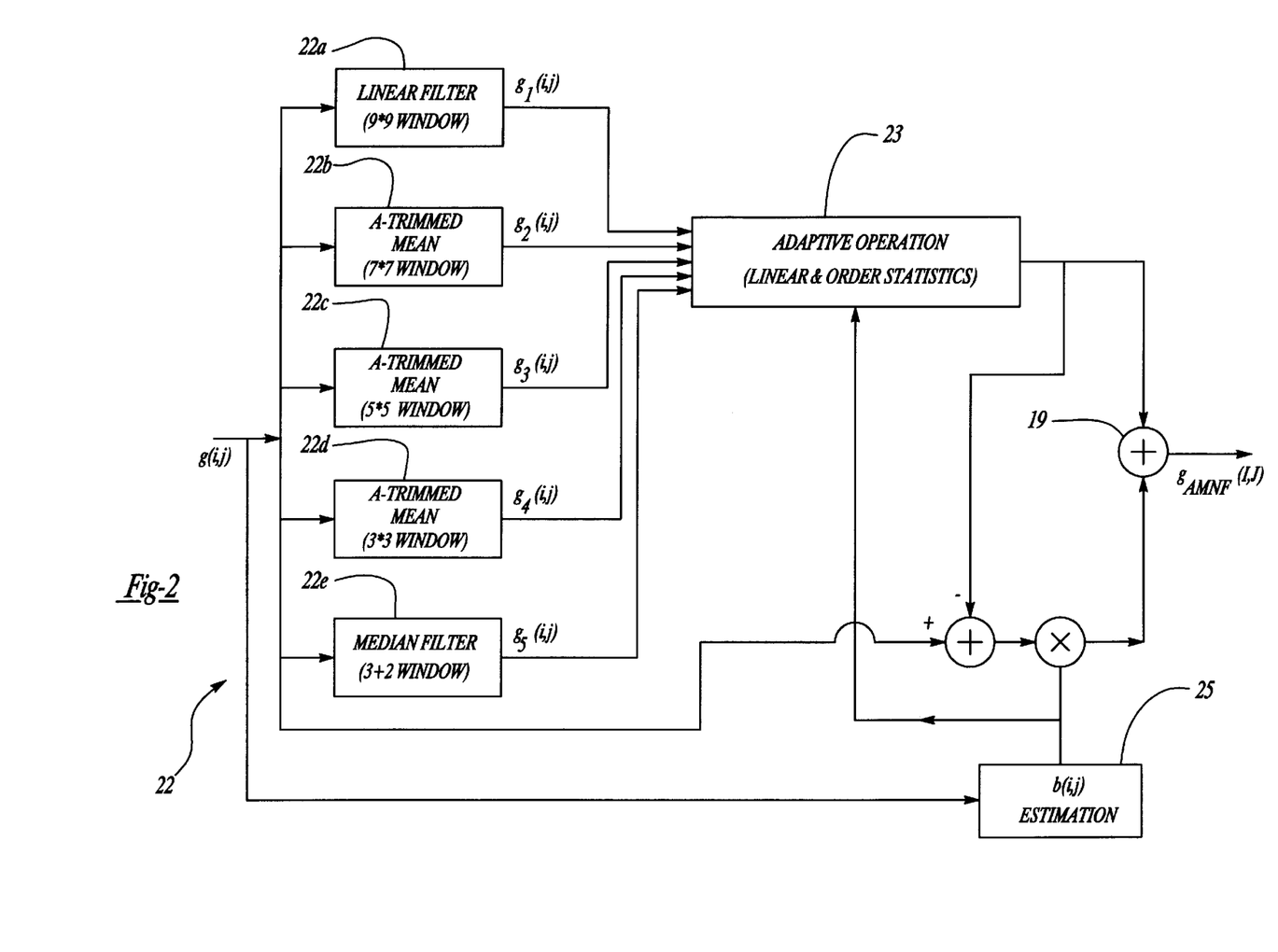
FIG. 2 is a block diagram of the filter of the preferred embodiment of the subject invention.

The analyzer 20 is identified in FIG. 1, details in FIG. 2 in which the input mammographic image $\{g(i,j)\ 1 \leq i \leq N, 1 \leq j \leq M\}$ expressed as $g(i,j)$ is first filtered by adaptive multistage nonlinear filter 22 (AMNF) designed to suppress image noise and smooth background details. The output image here is expressed as $g_{AMNF}(i,j)$.

Then, decomposing means 24 decomposes the filtered image $g_{AMNF}(i,j)$ (16) by a wavelet transform into a decomposed image 18. More specifically, the decomposer 24 decomposes the filtered image into a set of independent, spatially oriented frequency subimages (lower resolution subimages). The subimages are divided into two categories, (a) the subimages that include the information of clinical features, which are called Group 1, and (b) the subimages that do not include the information of diagnostic features, or, image background, which are called Group 2.

The two decomposed images, $g_{w1}(i,j)$, and $g_{w2}(i,j)$, are reconstructed by reconstructing means 26, a recursive wavelet transform in the preferred embodiment, $g_{w1}(i,j)$, from the subimages Group 1, and $g_{w2}(i,j)$, from subimages Group 2.

The reconstructor 26, therefore, generates two reconstructed images, Group 1 containing an enhanced image of the suspicious area or diagnostic feature of interest and Group 2 an image of background structures. Image enhancement of the diagnostic feature of interest is obtained using the combination of these two images and the filtered image using weighing coefficients $\alpha_1$, $\alpha_2$ and $\alpha_3$ indicated in FIG. 1. More specifically, in the final step the difference image is created by taking the difference between $\alpha_1\ g_{AMNF(i,j)}$ and $\alpha_3\ g_{w2}(i,j)$, the resulting difference image then being added to the image $\alpha_2\ g_{w1}(i,j)$, ($\alpha_1,\alpha_3$ and $\alpha_3$ are integers). Linear scaling scales all the images to the same range of gray level.

Criterion and Structure For the AMNF: A local linear minimum mean square error (LLMMSE) filter is derived based on a nonstationary mean and a nonstationary variance (NMNV) image model. The nonstationary mean describes the gross structure of an image and the nonstationary variance describes the edge and elementary texture information of the image. The adaptive multistage nonlinear filter is designed for enhancing the clinical features while removing noise and smoothing the background information.

By way of example, a mammogram is corrupted by two kinds of noise; additive noise and multiplicative noise.

Additive Noise Considerations: Mammograms containing only additive noise can be considered as the following observation equation $$g = f + n \qquad (1)$$

wherein g is the degraded observation, f is the original image, n is zero mean noise that can be signal-dependent.

The minimum mean square error (MMSE) estimate of f given observation g is the conditional mean estimate $$\bar{f}=E(f|c) \quad (2)$$

In general, the MMSE estimate is nonlinear and depends on the probability density functions of f and n. The explicit form of the MMSE estimator is difficult to obtain for mammography. If we impose a linear constraint on the estimate structure, we have the linear minimum mean square error (LMMSE) estimator.

$$\bar{f}_{LMMSE}=E(f)+C_{fg}C_g^{-1}(g-E(g)) \quad (3)$$

wherein $C_{fg}$ is the cross-covariance matrix of f and g; and $C_g$ and $E(g)$ are the covariance matrix and ensemble mean of g, respectively.

Unlike the MMSE filter, the LMMSE only requires the second order statistics of the signal and noise. Because of the local nature of mammograms, we use a local linear minimum mean square error (LLMMSE) as the criterion. The cross-covariance matrix $C_{gf}$ under (LLMMSE) is given by $$\begin{aligned}C_{fg} &= E[(f-E(f))(g-E(g))^T] \quad (4)\\ &= E\{(f-E(f))[(f-E(f))+n]^T\}\\ &= C_f + E[(f-E(f))n^T]\end{aligned}$$

Similarly, the covariance matrix $C_g$ can be calculated as $$\begin{aligned}C_g &= E[(g-E(g))(g-E(g))^T] \quad (5)\\ &= E\{[(f-E(f))+n][(f-E(f))+n]^T\}\\ &= C_f + C_n + E[(f-E(f))n^T] + E[n(f-E(f))^T]\end{aligned}$$

Wherein $C_n$ is the covariance matrix of n. Mammography screening assumes the conditional mean of n given f is 0, i.e., $E(n|f)=0$. Another special case arises if the noise term n is uncorrelated, i.e., $$E[n(i,j)n(r,s)]=0 \text{ for } (i,j) \neq (r,s) \quad (6)$$

Continuing with the assumption that $C_f$ is diagonal, the cross-covariance matrix $C_{fg}$ becomes diagonal. These assumptions, together with the assumption of (6), imply that the covariance matrix $C_g$ is diagonal. Under these conditions, the LMMSE filter (3) becomes a scalar processor of the form $$\bar{f}_{LMMSE} = E(f(i,j)) + \frac{\sigma_f^2(i,j)}{\sigma_f^2(i,j)+\sigma_n^2(i,j)} [g(i,j)-E(g(i,j))] \quad (7)$$

wherein $\sigma_n^2(i,j)$ is the nonstationary noise ensemble variance and $\sigma_f^2(i,j)$ is the local spatial variance of $f(i,j)$.

Multiplicative Noise Considerations: Mammograms containing only multiplicative noise can be represented as the following observation equation $$g = f \cdot W \quad (8)$$

When mammograms corrupted by both additive and multiplicative noise, the equations of (1) and (8) may be extended to dealt herewith as described by $$g = f \cdot w + n \quad (9)$$

in which the statistical characteristics are the same as given in Equations (1) and (8). An optimal linear approximation is used to produce a filtering algorithm similar to that for the additive noise case. Expressing g as a first-order Taylor expansion about $(\bar{f},\bar{w})$ yields $$g_{output}(i,j)=\bar{g}(i,j)+b(i,j)(g(i,j)-\bar{g}(i,j)) \quad (10)$$

wherein $$b(i,j) = \frac{\sigma_f^2(i,j)}{\bar{f}(i,j)\sigma_w^2(i,j)+\sigma_f^2(i,j)+\sigma_n^2(i,j)} \quad (11)$$

If all the a priori image and noise statistics of Equation (7) are known, then $\bar{f}_{LLMMSE}(i,j)$ is a function of measurements $g(i,j)$ only, and each estimated pixel can be produced in parallel and in real-time.

The LLMMSE estimate is a weighted sum of the ensemble mean $E(f(i,j))$ and the normalized observation $g(i,j)$, wherein the weight is determined by the ratio of the signal variance to the noise variance. For a low signal to noise ratio (SNR), the LLMMSE filter puts more weight on the a priori mean $E(f(i,j))$ because the observation is too noisy to make an accurate estimate of the original image. Conversely, for high SNR, the LLMMSE estimate puts more weight on the noisy observation and the result is a preservation of the edge sharpness.

The LLMMSE filter shown in Equation (7) requires the ensemble mean and variance of $f(i,j)$. Usually these statistics are not available and can only be estimated from the degraded image. If an assumption is made whereby the ensemble statistics can be replaced by local spatial statistics that are estimated from the degraded image [10, 14], the adaptive filter can be characterized by $$\bar{f}_{LLMMSE}=\bar{f}(i,j)+b(i,j)[g(i,j)-\bar{g}(i,j)] \quad (12)$$

wherein $\bar{f}(i,j)$ and $\bar{g}(i,j)$ are the local spatial means of $f(i,j)$ and $g(i,j)$, respectively, and $\sigma_f^2(i,j)$ is the local spatial variance of $f(i,j)$.

In practice, however, $f(i,j)$ is not available. Therefore, $E(f(i,j))$ may be derived from the degraded observation $g(i,j)$. Based on the degradation model expressed in Equation (1), which is assumed that $n(i,j)$ is a zero mean $$E(g(i,j))=E(f(i,j)) \quad (13)$$

Then, Equation (7) can be expressed as $$\bar{f}_{LLMMSE} = \bar{g}(i,j) + \frac{\sigma_f^2(i,j)}{\sigma_f^2(i,j)+\sigma_n^2(i,j)} [g(i,j)-\bar{g}(i,j)] \quad (14)$$

The filter expressed by Equation (14) is called a two-channel filter. The filter input signal, $g(i,j)$, is split into a low-frequency signal, $g_L(i,j)$, and high-frequency signal, $g_H(i,j)$, by appropriate filters. The high-frequency signal $g_H(i,j)$, is weighted with a signal-dependent weighing factor $b(i,j)$. Corresponding to the filter expressed by Equation (10), $g_L(i,j)=\bar{g}(i,j)$, $g_H(i,j)=g(i,j)-\bar{g}(i,j)$ and $b(i,j)=\sigma_f^2(i,j)/(\sigma_f^2(i,j)+\sigma_n^2(i,j))$. A two-component model like this is suitable not only for noise suppression, but also for many other enhancement operations.

Filter Structure (AMNF): The low-frequency signal $g_L(i,j)$ is substituted by two stage structured filters. In the first stage, five different kind filters 22a–22e are used including linear smoothing filter, nonlinear a-trimmed mean filters with different window size and a median filter. In the second stage, the adaptive filter is used including linear or order statistic operation 23.

The structure of the filter is shown in FIG. 2, and the filter is called adaptive multistage nonlinear filter (AMNF). The output of the filter is $$g_{AMMF}(i,j)=g_{ALOS}(i,j)+b(i,j)(g(i,j)-g_{ALOS}(i,j)) \quad (15)$$

Here, $g_{ALOS}(i,j)$ is a result from the second stage filter called adaptive linear or order statistic operation 23 and $b(i,j)$ 25 is a signal-dependent weighing factor which is a measure of the local signal activity. In the flat regions of the input image, signal-to-noise ratio is small, so the signal-dependent weighing factor b(i,j) 25 becomes small and that will lead $g_{AMNF}(i,j)$ to the limit $g_{ALOS}(i,j)$; refer to Equation (15). While in the edges, the signal-to-noise ratio is large, so b(i,j) approaches 1 whereby $g_{AMNF}(i,j)$ approaches the limit g(i,j), so the operation of the filter tends to preserve the edges.

Filter Types And Window Size (AMNF): In order to achieve a better adaptive signal, five different filters 22a–22e with different window size are selected according to the value of b(i,j) 25. With respect to an appropriate window size W, two effects must be taken into account. The noise suppression increases with increasing window size and, conversely, the space resolution decreases with increasing window size. In addition, linear filters smooth the edges, average the details and noise and decrease greatly the space resolution.

By way of example, a nonlinear filter with a small window (e.g., 3×3 or 2×2) is used in microcalcification areas in digital mammograms. The filtering is repeated for the feature preservation. A linear filter with a large window (e.g. 7×7 or 9×9) is used in the useless resolution scale level areas for noise removal and background smoothing. α-trimmed mean filters may also be used as they offer a compromise in performance between linear filters and nonlinear filters.

Adaptive Operation (AMNF): The adaptive linear operation 23 enhances the contrast of specific clinical features, such as micro califications and tumors in digital mammography. The adaptive order statistic operation 23 enhances image texture. In defining the linear operation, the outputs from the five filters 22a–22e in the first stage of FIG. 2 are defined as a vector of linear weighted values, which is expressed as $$g_l = C^T g_j, \quad 1 \leq j \leq m, \quad \forall j \in Z^L \qquad (16)$$

wherein $\underline{m}$ is the number of the outputs from first stage (m=5 in FIG. 2). The coefficients $\underline{c}_i$ determine various linear weighted operations. The weighing factor b(i,j) 25 which is a measure of the local signal activity in Equation 15 can be applied as a criterion for the adaptivity of coefficients which is as follows;

$$[c_1, c_2, c_3, c_4, c_5]^T = \begin{cases} [1,0,0,0,0]^T & b(i,j) \leq \tau_1 \\ [0,1,0,0,0]^T & \tau_1 < b(i,j) \leq \tau_2 \\ [0,0,1,0,0]^T & \tau_2 < b(i,j) \leq \tau_3 \\ [0,0,0,1,0]^T & \tau_3 < b(i,j) \leq \tau_4 \\ [0,0,0,0,1]^T & \tau_4 < b(i,j) \end{cases} \qquad (17)$$

In defining the order statistic operation, the spatial or temporal distribution of the input sequence $(g_j)$ is not of interest. Instead, the vector of order statistics (algebraically ordered versions) $g(j) = \text{order}[g_j] = [g_{(1)j} \; g_{(2)j} \; \cdots \; g_{(m)j}]^T$, defined such that $g_{(1)j} \leq g_{(2)j} \leq \cdots \leq g_{(m)j}$. Given a vector of real-valued coefficients $\underline{a} = [\underline{a}_1 \; \underline{a}_2 \; \cdots \; \underline{a}_m]$ with length m, the output of the order statistic operation is $$g_{os} = a^T g_{(j)}, \quad 1 \leq j \leq m, \quad \forall j \in Z^L \qquad (18)$$

wherein $\underline{m}$ is the number of the input pixels, $g_{(j)} = \text{order}[g_j]$ and the coefficients $\underline{a}_i$ determine various order statistics operations, namely the edge detection including range edge detector ($a_m=1$, $\underline{a}_1=-1$) and quasi-range edge detector ($a_{(m-i)}=-1$). The filterings include the median filter ($a_L+1=1$, $\underline{a}_i=0$, $i \neq L+1$), the more general $k^{th}$ rank-order filter ($\underline{a}_k=1$, $\underline{a}_i=0$, $i \neq k$), the averaging filter ($\underline{a}_i=1/m$) which is the linear smoothing order statistic filter, and the α-trimmed mean filter ($\underline{a}_j = 1/(m-2[\alpha m])$, $[\alpha m]+1 \leq j \leq m-[\alpha m]$, $\underline{a}_i=0$, $i \neq j$) where $[\alpha m]$ corresponds to the greatest integer of $\alpha m$ and α is a control factor ($0 \leq \alpha \leq 0.5$). The adaptivity of coefficients $\underline{a}_i$ is as follows;

$$[\underline{\alpha}_1, \alpha_2, \alpha_3, \alpha_4, \alpha_5]^T = \begin{cases} [0,0,1,0,0]^T & b(i,j) \leq \beta_1 \\ [0,1,0,-1,0]^T & \beta_1 < b(i,j) \leq \beta_2 \\ [1,0,0,0,-1]^T & \beta_2 < b(i,j) \end{cases} \qquad (19)$$

An optimal least-squares order statistics filter is used for estimating an arbitrary signal immersed in arbitrary noise. The output of the optimal order statistics filter is $$E_j = E[(x_j - S_j)^2] = \alpha^T \Phi_j \alpha - 2S_j \alpha^T \mu_j + S_j^2 \qquad (20)$$

where $\Phi$ is the order statistics correlation matrix, $\Phi_j = E[g_{(j)} g_{(j)}^T]$, with elements $\Phi_{i,j} = E[g_{(i);j} g_{(i);j}]$ and $\mu$ equalling the order statistics mean vector, $\mu = E[g_{(j)}]$, with elements $\mu_{i;j} = E[g_{(i);j}]$. The goal of the optimal order statistics filter is to produce an output sequence $\{\underline{x}_{(j)}\}$ approximating $\underline{S}_j$ as closely as possible. Minimizing Equation (20) over $\underline{\alpha}^T$ is a quadratic optimization problem with an existing unique solution since $\Phi_j$ is a positive definite matrix, currently limited only by certain computational obstacles.

Parameter Computations For The AMNF: One way to obtain the local mean and local variance is to calculate over a uniform moving average window of size (2r+1)×(2s+1). We then have $$\bar{g}(k,l) = \frac{1}{(2r+1)(2s+1)} \sum_{p=i-r}^{i+r} \sum_{p=j-s}^{j+s} g(p,q) \qquad (21)$$

wherein g(i,j) and $\sigma_g^2(i,j)$ are the local mean and local variance of g(i,j), respectively, $$\sigma_g^2 = \frac{1}{(2r+1)(2s+1)} \sum_{p=i-r}^{i+r} \sum_{q=j-s}^{j+s} (g(p,q) - \bar{g}(i,j))^2 \qquad (22)$$

which are commonly known as the sample mean and sample variance. It is straight forward to show that the local variance of f(i,j) is given by $$\sigma_f^2(i,j) = \sigma_g^2(i,j) - \sigma_n^2(i,j) \qquad (23)$$

wherein $\sigma_n^2(i,j)$ is the nonstationary noise variance. The function $\sigma_n^2(i,j)$ is assumed known from a priori measurement on the mammographic screening system. As an example of the computation of local statistics of imaging system, the typical degradation model of Poisson noise is commonly given in mammographic screening system, which is $$g^*(i,j) = \text{Poisson}_\lambda(f(i,j)) \qquad (24)$$

wherein $\text{Poisson}_\lambda(\bar{\ })$ is a Poisson random number generator, and λ is a proportionality factor. The probabilistic description of a Poisson process is given by $$P(g(i,j)|f(i,j)) = \frac{(\lambda f(i,j)^{g(i,j)}) e^{-\lambda f(i,j)}}{g(i,j)!} \qquad (25)$$

The conditional ensemble mean and variance of g*(i,j) given f(i,j) are $$E[g^*(i,j)|f(i,j)] = \lambda f(i,j) \qquad (26)$$

$$\text{ar}[g^*(i,j)|f(i,j)] = \lambda f(i,j) \qquad (27)$$

We define the normalized observation as $$g(i,j) = \frac{g^*(i,j)}{\lambda} = \frac{Poisson_\lambda(f(i,j))}{\lambda} \quad (28)$$

Therefore, the noise part has the form and its variance can be shown to be $$n(i,j) = g(i,j) - f(i,j) = \frac{Poisson_\lambda(f(i,j))}{\lambda} - f(i,j) \quad (29)$$

$$\sigma_n^2(i,j) = E(f(i,j))/\lambda \quad (30)$$

From these equations, the ensemble variance of f(i,j) can be obtained $$\begin{aligned}\sigma_f^2(i,j) &= \sigma_g^2(i,j) - (\bar{f}(i,j)/\lambda) \\ &= \sigma_g^2(i,j) - (\bar{g}(i,j)/\lambda)\end{aligned} \quad (31)$$

Wavelet Decomposition And Reconstruction (TSWT): An important notation of wavelet decomposition and reconstruction is that of resolution. The resolution of a signal is linked to its frequency content. The difference of information between the approximation of images at resolutions $2_{k+1}$ and $2^k$ can be extracted by decomposing them in a wavelet orthonormal basis of $L^2(R)$. Wavelet transforms are linear and square-integrable transforms just like the more familiar Fourier, Laplace, Hilbert, Radon and Hadamard transforms. They are made special by their kernels called wavelets $W(\alpha,\beta)$, where $\alpha$ is called "scale" and $\beta$ is called "shift". There are many kernels one can use, all of which are derived from a "mother" kernel or wavelet by scale changes. Thus, in addition to frequency coordinates, there are shift coordinates.

In discrete-time signals, increasing the scale of the wavelets involves subsampling, which automatically reduces the resolution. Conversely, decreasing the scale, which involves subsampling, does not change the resolution. As one varies the shift $\alpha$, the wavelet transform or wavelet coefficients are calculated for different spatial locations $\beta$ in the input. A major advantage of the wavelet functions is that they can be calculated easily by scaling a mother wavelet, a very attractive property for digital implementation and data compression.

Wavelet Decomposition (TSWT): The basis function of a discrete wavelet transform can be expressed as follows;

$$\psi_{m,n}(x) = 2^{-m/2}\psi_{m,n}(2^{-m}x-n) \quad n,m \in Z \quad (32)$$

wherein Z is the set of integers.

When subjected to the functional operations of shifts and dyadic dilation, $\psi$ yields an orthogonal basis of $L^2(R)$ which is the vector (Hilbert) space of measurable, square-integrable functions. This means that the functions of Equation (32) form a complete orthonormal system for $L^2(R)$. The wavelet basis induces an orthogonal decomposition of $L^2(R)$, which is given as follows;

$$L^2(R) = \ldots \oplus \underline{W}_{-2} \oplus \underline{W}_{-1} \oplus \underline{W}_0 \oplus \underline{W}_1 \oplus \underline{W}_2 \oplus \ldots \quad (33)$$

wherein $\underline{W}_i$ is the wavelet subspace spanned by $\{\psi_{m,n}(x)\}_{n=-\infty}^{n=+\infty}$.

The wavelet $\psi(x)$ is often generated from scaling function or the "father wavelet". The scaling function $\Phi(x)$ satisfies the two-scale difference equation $$\Phi(x) = \sqrt{2}\sum_k h_1(k)\Phi(2x-k) \quad (34)$$

The dilations and translations of the scaling function induce a multiresolution analysis of $L^2(R)$, a nested chain of closed subspaces of $L^2(R)$ ( $\ldots \subset \underline{V}_{-1} \subset \underline{V}_0 \subset \underline{V}_1 \subset \underline{V}_2 \ldots$ ) such that $\underline{V}_{-\infty}\{0\}, \underline{V}\infty = L^2(R)$ wherein $\underline{V}_i$ is the subspace spanned by $\{\Phi_{m,n}(x)\}_{n=+\infty} \cdot \underline{V}_i$ and $\underline{W}_i$ are related by $\underline{V}_i \oplus \underline{W} = \underline{V}_{i+1}$ which extends to $\underline{V}_i \oplus \underline{W}_{i+1} = \underline{V}_{i+2}$ Then, the wavelet kernel $\psi(x)$ is related to the scaling function.

$$\psi(x) = \sqrt{2}\sum_k h_2(k)\Phi(2x-k) \quad (35)$$

$$\text{for } h_2(k) = (-1)^{1-k}h_1(1-k) \quad (36)$$

wherein $h_2(k)$ is the mirror filter of $h_1(k)$. In digital signal processing domain, $h_2(k)$ and $h_1(k)$ are called Quadrature Mirror Filter (QMF). The coefficients $h_1(k)$ and $h_2(k)$ play a very crucial role in a given wavelet transform. In fact, the implementation of a wavelet transform does not require the explicit forms of $\Phi(x)$ and $\psi(x)$ but only depends on $h_1(k)$ and $h_2(k)$. The coefficients $h_1(k)$ in Equation (34) have to meet several conditions for the set of basis wavelet functions in Equation (32) to be unique, orthonormal and with a certain degree of regularity.

Based on wavelet transform, any signal $f(x) \in L^2(R)$ can be represented as a set of functions formed from $\Phi(x)$ and $\psi(x)$ spanned all of $L^2(R)$. The wavelet expansion called discrete wavelet transform (DWT) of the signal f(x) can be calculated by inner products as $$c_{m,n} = <f(x), \Phi_{m,n}(x)> = \int_{-\infty}^{+\infty} f(x)\Phi_{m,n}(x)dx \quad (37)$$

and $$d_{m,n} = <f(x), \psi_{m,n}(x)> = \int_{-\infty}^{+\infty} f(x)\psi_{m,n}(x)dx \quad (38)$$

The corresponding relationship of the scaling coefficients is $$c_{m,n} = \sum_k h_1(k-2n)c_{m-1,k} \quad (39)$$

The corresponding relationship of the wavelet coefficients is $$d_{m,n} = \sum_k h_2(k-2n)c_{m-1,k} \quad (40)$$

The coefficients $c_{m,n}$ and $d_{m,n}$ at scale m are related to the coefficients $c_{m-1,n}$ at scale m−1, which provides a recursive algorithm for wavelet decomposition through $h_1(k)$ and $h_2(k)$. After M-level decomposition, the final outputs include a set of M-level wavelet coefficients $d_{m,n}$, $1 \leq m \leq M$, and the coefficient $c_{M,n}$ for a low resolution component $\Phi_{M,n}(x)$. These wavelet coefficients completely describe the original signal.

In order to apply wavelet decompositions to images, two-dimensional extensions of wavelets are required. An efficient way to construct this is to use "separable wavelets" obtained from products of one-dimensional wavelets and scaling function. The two dimensional functions can be constructed as $$\Phi(x,y) = \Phi(x)\Phi(y) \quad (41)$$

$$\Psi(x,y) = \Psi(x)\Psi(y) \quad (42)$$

$$\Psi(x,y) = \Psi(x)\Phi(y) \quad (43)$$

The functions of Equations (41–43) correspond to the separable two-dimensional filter banks.

Wavelet Reconstruction (TSWT): By using a similar approach, recursive algorithm can be derived for function synthesis i.e., wavelet reconstruction, based on its wavelet coefficients $d_{m,n}$, $1 \leq m \leq M$ and $c_{M,n}$ $$c_{m,k} = \sum_n h_1(k - 2n)c_{m+1,k} + \sum_n h_2(k - 2n)d_{m+1,k} \quad (44)$$

Therefore, the function f(x) can be reconstructed from an expansion in terms of the scaling function and wavelets, which is $$f(x) = \sum_{m,n} c_{m,n}\Phi_{m,n}(x) + \sum_{m,n} d_{m,n}\psi_{m,n}(x) \quad (45)$$

In the previous section, it was shown that when the wavelet is used for signal multiresolution decompositions, it is called an analysis filter bank and it divides the signal into M(M>1) filtered and subsampled versions. When the wavelet is applied for signal reconstruction, it is called synthesis filter bank and generates a single signal from M upsampled and interpolated signals. The purpose of the analysis filter bank is to separate the frequency-bands as independently as possible. The purpose of the synthesis filter bank is to eliminate the error images caused by the subsampling and upsampling operations.

The input image is decomposed by analysis filters and then subsampled into subimages. The subimages can then be reconstructed from the M subsampled channels without any distortion, if the synthesis filters satisfy the perfect-reconstruction condition. This is the condition where operations in the analysis part have been matched by equivalent operations in the synthesis part in order to reproduce the input image exactly at the output.

Parameter Adjustment For AMNF-TSWT By The Filter FIG. 2: The parameters which need to be adjusted are included; 1) $\alpha$ in FIG. 2 for $\alpha$-trimmed mean filters, 2) $\alpha_1$ $\alpha_2$ and $\alpha_3$ in FIG. 1 for balancing the image information, 3) $\lambda$ for poisson noise parameter, 4) the adaptive thresholding parameters for adaptive linear operation including $\tau_1$, $\tau_2$ $\tau_3$ and $\tau_4$ from equation (17) and 5) the adaptive thresholding parameters for adaptive order statistic operation including $\Theta_1$ and $\beta_2$ from equation (19). The trimmed mean is so called because, rather than averaging the entire data set, a few data pixels are removed (trimmed) and the remainder are averaged. The pixels which are removed are extreme values, both low and high, with an equal number of pixels dropped at each end (symmetric trimming). $\alpha$ assumes values between 0 and 0.5. If $\alpha=0$, no pixel is trimmed and then $\alpha$-trimmed mean filter is equal to linear average filtering operation. If $\alpha=0.5$, all the pixels except median value pixel are trimmed and, therefore, $\alpha$-trimmed mean filter is equal to sample median operation. $\alpha$ is a compromise parameter between linear average filtering and nonlinear median filtering. By way of example, in our experiments using digital mammographic images, $\lambda=0.9$ for Poisson noise parameter was used. In order to get a set of suitable values of $\alpha_1$ $\alpha_2$ and $\alpha_3$, twenty mammograms were used for training the parameters. The coefficients of $\{\alpha_1, \alpha_2,\alpha_3\}$ which were from $\{1, 1, 1\}$ to $\{10, 10, 10\}$ were corresponded to different level of feature enhancement. $\tau_1$, $\tau_2$,$\tau_3$, $\tau_4$ and $\beta_1$, $\beta_2$ are important parameters for the performance of AMNF filter, larger values of them get more smooth results corresponding to bigger feature enhancement and smaller values of them get more detail results corresponding to more trivial feature enhancement.

Preliminary investigations have been performed on other medical images and different diagnostic features such as digital chest (digitization of x-ray screen film) for nodule detection and light sensitive charged coupled device (CCDs) for gray scale imaging of skin lesions and the retina (nerve fiber bundle) of the human eye in evaluation of glioma. When the filter parameters, as outlined above, where fixed, satisfactorily enhanced images (contrast/texture) were obtained suggesting the AMNF-TSWT filter is sensor and image independent.

Multistage Artificial Neural Network (MANN): Once suspicious areas in the digital image 10 have been enhanced, a neural network 28 receives the enhanced image 19 and automatically detects (12") the suspicious areas within the enhanced image 19.

Figure 3:
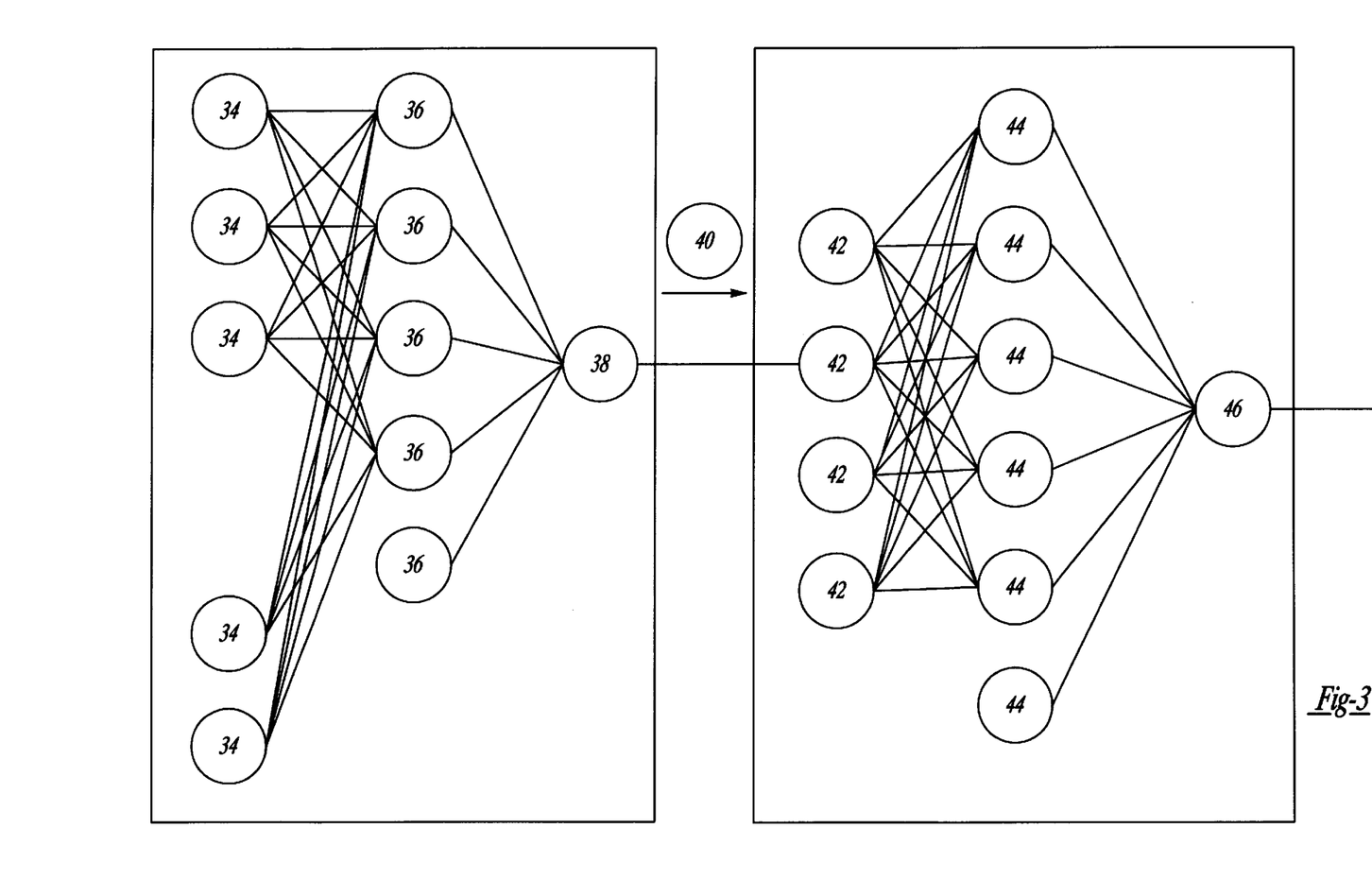
FIG. 3 is a block diagram of the neural network of the preferred embodiment of the subject invention.

The multistage neural network is depicted in FIG. 3 having first 30 and second 32 stages. In this architecture, the first stage 30 is called the "detail network" where all pixel values of an enhanced image is used as its input for the first layer of neurons 34. The output of the first layer of neurons 34 is then weighted and transmitted to the second layer of neurons 36. Likewise, the output of the second layer of neurons 36 is weighted and sent to the third layer, a single neuron 38.

The second stage 32 is know as a "feature network" where the actual output 38 from the first stage 30 of the neural network 28 and a set of features extracted from the original digital image 10 are used as the input neurons 40 of the second stage 32. By way of example, for digital mammograms where microcalification are to be detected, these features include average, variance, average-energy and energy variance of input image-blocks, of which the variance and the energy-variance are defined by:

$$var = \left[ \frac{1}{M \times N} \sum_{i=1}^{M} \sum_{j=1}^{N} [x(i,j) - avg]^2 \right]^{1/2} \quad (46)$$

and $$evar = \left[ \frac{1}{M \times N} \sum_{i=1}^{M} \sum_{j=1}^{N} [x(i,j)^2 - eavg]^2 \right]^{1/2} \quad (47)$$

respectively, wherein avg and eavg are the average and the average-energy of an input image-block x(i,j), i=1,2, . . . ,M,j=1,2, . . . ,N, respectively. Two of these features, such as average and energy-variance, are used as inputs of the second stage 32 of the neural network, other features are then used as detection parameters which will be discussed later. These inputs are weighted and sent to the second set of neurons 44. Other features would be used for different suspicious areas such as tumors in digital mammograms.

In this multistage architecture, each stage is three layer feed-forward neural network, i.e., three rows of neurons in FIG. 3, with a hidden layer, in which the output of a neuron (unit or node) is an integrated sum of weighted inputs. Its output is shaped by a sigmoid-like function and servers as input to the next layer of neurons. By use of training algorithms the neural network can be trained to certain states. The output is given by the following equation:

$$\text{output} = \frac{1 - \exp(-\Sigma_i w_i x_i)}{1 + \exp(-\Sigma_i w_i x_i)} \quad (48)$$

wherein $x_i$ and $w_i$ are the input and its weight. It has been shown that this structure can form a good approximation to any continuous boundary.

The output 46 of the second stage 32 receives the outputs of the second set of neurons 44 and is used as the decision value for classification, i.e. a target 12" or not. By way of example, for digital mammograms in order to improve the reliability and the accuracy of the detection, when we apply the multistage neural network for the detection of microcalification clusters, the output 40 of the neural network 28 at the second stage 32 is modified as $$\text{output2} = \frac{1 - \exp(-\Sigma_i w_i x_i + v)}{1 + \exp(-\Sigma_i w_i x_i + v)} \quad (49)$$

for v>t, and $$\text{output2} = \frac{1 - \exp(-\Sigma_i w_i x_i)1 - \exp(-v)}{1 + \exp(-\Sigma_i w_i x_i)1 + \exp(-v)} \quad (50)$$

for v<t, where t is threshold value and v is the variance or the energy-variance. The variance is known as the detection parameter because it affects the detection reliability. If the variance is used as the input of the "feature network", we select the energy-variance as the detection parameter, alternatively, if the energy-variance is used as the input of the network, the variance is taken as the detection parameter.

Again, by way of example, the above modification is based on the fact that for digital mammograms, the areas with micro-calcification clusters and their surrounding normal tissues have the different intensity such as their average, variance, energy and its variance in which the variance or energy-variance potentially plays a more significant role. Generally, the variance (or energy-variance) of the former is more than that of the latter.

Kalman Filtering (KF) Algorithm Training: Two algorithms, the back-propagation algorithm with Kalman filtering (KF) and augment Lagrange programming (ALP) with KF train the proposed multistage neural network 28. The former is based on a generalized delta learning rule. Whereas, the latter training algorithm is an augmented Lagrange programming problem (an equality-constrained optimization problem) in which the back-propagation of errors is replaced by iteration of state variables (outputs of neurons) corresponding to Lagrange-multipliers. Updating of weights and state-variables can be performed in parallel. As a result the convergence rate is very fast. Another attractive feature of the augment-Lagrange programming based algorithms is that in training different layers of the neural network 28, they are mutually exclusive or independent. Therefore, the neural network 28 is specially suitable for parallel processing and has significantly better convergence properties than conventional back propagation algorithms.

Using the above algorithms, the first-stage 30 and the second-stage 32 of the neural network 28 are sequentially trained. The input, which is the target object 12 is an enhanced image 12', is provided to the input layer of the first-stage 30 of the neural network 28. The actual output of the first-stage neural network, which has been trained, and a set of features such as variance and energy from the original image, are provided to the input layer of the second-stage neural network. Its output corresponds to the output of whole network. The desired output is provided to the output layer at each stage during the training process.

In both the back propagation algorithm with Kalman filtering and the augment-Lagrange programming based algorithm with Kalman filtering, the update for the weights is used on the following equation:

$$W_0(t) = W_0(t-1) + k_0(t)(d_0 - y_0) \quad (51)$$

and hidden layer weight $$W_j(t) = W_j(t-1) + k_j e_j u_j \quad (52)$$

with the Kalman gain vector:

$$k_j(t) = \frac{R^{-1}(t-1)X_{j-1}(t)}{B + X_{j-1}^t(T)R_j^{-1}(t-1)X_{j-1}(t)} \quad (53)$$

and the update equation for the inverse matrix:

$$R_j^{-1}(t) = [I - k_j(t)x_{j-1}^{-1}(T)]R_j^{-1}(t-1)/b_j \quad (54)$$

wherein I is an identity matrix, x is the input at each layer, do is the desirable output, and $y_0$ is the actual output. b is a "forgetting" factor, $u_j$ is the convergence rate, and $e_j$ is the back-propagation error which is replaced by iteration of state variables corresponding to Lagrange-multipliers in the augment-Lagrange-based algorithm.

Contrary to the standard back propagation algorithm which minimizes the mean-squared error with respect to the weights, the mean-squared error is minimized between the desired output and the actual output with respect to the summation outputs (inputs to the nonlinearities). Error signals, generated by the back propagation algorithm or state variables corresponding to different Lagrange-multipliers created by the algorithm, are used to estimate values at the summation outputs that will improve the total network error. These estimates along with the input vectors to the respective nodes, are used to produce an updates set of weights through a system of linear equations at each node. These systems of linear equations are solved using a Kalman filter at each layer. Training patterns are run through the neural network 28 until convergence is reached.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An imaging analyzing device for analyzing a digital image having at least one suspicious target area, normal parenchymal tissue and image background noise, the image analyzing device comprising:

first stage filter means for producing a first enhanced image, said first stage filter means including an adaptive multi-stage two dimensional using localized metrics as an adaptive criteria for filter type selection filter for filtering out background noise and selectively smoothing different tissues on a pixel by pixel basis in a manner to selectively enhance the suspicious target areas with the digital image; and second stage filter means for producing a second stage enhanced image with selective enhancement of suspicious target areas including a decomposer means for multiresolution wavelet transform, for decomposing said first enhanced image into subimages and a reconstructor means for reconstructing selected subimages relating to possible suspicious target area and background tissues, summing the image representing the reconstructed sub-images representing the suspicious target areas with said first stage enhanced image, substracting the image representing the reconstructed sub-images representing the background tissues, including the use of appropriate weighting factors.

2. A device as set forth in claim 1, further characterized by said adaptive multi-stage two dimensional filter further including two dimensional linear, non-linear and alpha trimmed mean filters, and having different filter windows, providing different levels of smoothing of image pixels.

3. A device as set forth in claim 2, further characterized by said adaptive multi-stage filter further including an adaptive order statistic operation for texture enhancement of the suspicious target areas of the digital image.

4. A device as set forth in claim 2, further characterized by said adaptive multi-stage two dimensional filter further including an adaptive linear operation to enhance the contrast of the suspicious target areas of the digital image.

5. The device as set forth in any of claims 1, wherein the suspicious target areas further include possible microcalcifications and wherein said first and second stage filter means are designed to selectively enhance microcalcifications.

6. A device as set forth in claim 5, further characterized by including a neural network means for receiving said second stage enhanced image and extracting computed features to classify the suspicious target areas as either microcalcifications or normal tissues with the digital image.

7. A device as set forth in claim 6, further characterized by said neural network including a first and second stages, wherein said image pixels from the enhanced image means are used as input features to said first stage of said neural network, and wherein the output of said first stage of said neural network and additional extracted features from the original image are used as input to said second stage to classify the suspicious areas as either microcalcifications or normal tissue.

* * * * *